United States Patent
Inoue et al.

(10) Patent No.: US 12,509,432 B2
(45) Date of Patent: Dec. 30, 2025

(54) ALICYCLIC EPOXY COMPOUND PRODUCT

(71) Applicant: DAICEL CORPORATION, Osaka (JP)

(72) Inventors: Hiroko Inoue, Tokyo (JP); Hiroto Tanigawa, Tokyo (JP)

(73) Assignee: DAICEL CORPORATION, Osaka (JP)

(*) Notice: Subject to any disclaimer, the term of this patent is extended or adjusted under 35 U.S.C. 154(b) by 876 days.

(21) Appl. No.: 17/604,594

(22) PCT Filed: Apr. 10, 2020

(86) PCT No.: PCT/JP2020/016120
§ 371 (c)(1),
(2) Date: Oct. 18, 2021

(87) PCT Pub. No.: WO2020/213526
PCT Pub. Date: Oct. 22, 2020

(65) Prior Publication Data
US 2022/0194913 A1   Jun. 23, 2022

(30) Foreign Application Priority Data

Apr. 19, 2019 (JP) .................... 2019-080264

(51) Int. Cl.
*C07D 303/04* (2006.01)
*C07C 1/24* (2006.01)
(Continued)

(52) U.S. Cl.
CPC .............. *C07D 303/04* (2013.01); *C07C 1/24* (2013.01); *C07D 301/14* (2013.01); *C08G 59/24* (2013.01);
(Continued)

(58) Field of Classification Search
None
See application file for complete search history.

(56) References Cited

U.S. PATENT DOCUMENTS

| | | | |
|---|---|---|---|
| 2007/0179256 A1* | 8/2007 | Kitao | C07D 303/34 525/523 |
| 2008/0045729 A1 | 2/2008 | Takai et al. | |
| 2010/0249341 A1* | 9/2010 | Sato | C08L 63/00 549/547 |

FOREIGN PATENT DOCUMENTS

| | | | |
|---|---|---|---|
| JP | 2004359869 A | * | 12/2004 |
| JP | 2006-188476 A | | 7/2006 |

(Continued)

OTHER PUBLICATIONS

International Preliminary Report on Patentability and Written Opinion of the International Searching Authority for International Application No. PCT/JP2020/016120, dated Sep. 28, 2021, with English translation.

(Continued)

*Primary Examiner* — Ha S Nguyen
(74) *Attorney, Agent, or Firm* — Birch, Stewart, Kolasch & Birch, LLP

(57) ABSTRACT

Provided is an alicyclic epoxy compound product used in applications for forming a cured product excellent in transparency and heat resistance. An alicyclic epoxy compound product of the present disclosure has a purity of a compound represented by Formula (1) of 85 wt. % or greater; and a total content of a compound represented by Formula (a) and a compound represented by Formula (b) of 0.5 wt. % or less, (Continued)

where X represents a single bond or a linking group. The alicyclic epoxy compound product of the present disclosure can be produced through subjecting a compound represented by Formula (1″) to a dehydration reaction to obtain a compound represented by Formula (1′), and reacting the resulting compound represented by Formula (1′) with an organic peracid.

-continued

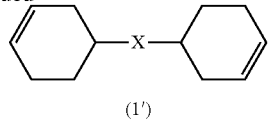

(1′)

16 Claims, 2 Drawing Sheets

[Chem. 1]

(1)

(a)

(b)

[Chem. 4]

(1″)

(51) Int. Cl.
| | |
|---|---|
| C07D 301/14 | (2006.01) |
| C08G 59/02 | (2006.01) |
| C08G 59/24 | (2006.01) |
| C09D 163/00 | (2006.01) |
| C09J 11/06 | (2006.01) |
| C09J 163/00 | (2006.01) |
| C09K 3/10 | (2006.01) |
| H01L 23/31 | (2006.01) |
| H10H 20/854 | (2025.01) |

(52) U.S. Cl.
CPC .......... *C09D 163/00* (2013.01); *C09J 163/00* (2013.01); *H10H 20/854* (2025.01)

(56) References Cited

FOREIGN PATENT DOCUMENTS

JP 2011052116 A * 3/2011
JP 2013-18921 A 1/2013

OTHER PUBLICATIONS

International Search Report for International Application No. PCT/JP2020/016120, dated Jun. 30, 2020, with an English translation.

* cited by examiner

ALICYCLIC EPOXY COMPOUND PRODUCT

TECHNICAL FIELD

The invention of the present disclosure relates to a high-purity alicyclic epoxy compound product. The present application claims priority to JP 2019-080264 filed in Japan on Apr. 19, 2019, the contents of which are incorporated herein.

BACKGROUND ART

Optical semiconductor devices using an optical semiconductor element, such as a light-emitting diode (LED), as a light source are currently used in a variety of applications, such as various indoor or outdoor display boards, light sources for image capture, traffic signals, and large display units. Such an optical semiconductor device typically has a structure in which an optical semiconductor element is encapsulated with a resin (encapsulating resin). The encapsulating resin plays a role to protect the optical semiconductor element from moisture, an impact, and the like.

In recent years, development of such optical semiconductor devices with higher power output and a shorter wavelength is in progress, and there is a problem of yellowing of the encapsulating resin due to heat generated from the optical semiconductor element, for example, in blue/white optical semiconductor devices. The yellowed encapsulating resin absorbs the light emitted from the optical semiconductor element and thus reduces the light intensity of the light output from the optical semiconductor device over time. Thus, a resin excellent in transparency and heat resistance is in need.

Patent Document 1 describes a curable epoxy resin composition. Patent Document 1 describes that the curable epoxy resin composition can form a cured product excellent in transparency. However, a composition capable of forming a cured product with even higher transparency has been called for. In addition, reducing the gelation time of the composition, that is, increasing the curability has been also required.

CITATION LIST

Patent Document

Patent Document 1: JP 2013-018921 A

SUMMARY OF INVENTION

Technical Problem

Thus, an object of the invention of the present disclosure is to provide an alicyclic epoxy compound product used in applications for forming a cured product excellent in transparency.

Another object of the invention of the present disclosure is to provide an alicyclic epoxy compound product used in applications for forming a cured product excellent in curability, transparency, and heat resistance.

Yet another object of the invention of the present disclosure is to provide a method for producing the alicyclic epoxy compound product.

Still another object of the invention of the present disclosure is to provide a curable composition capable of forming a cured product excellent in curability, transparency, and heat resistance.

Still another object of the invention of the present disclosure is to provide an encapsulant, adhesive, or coating agent capable of forming a cured product excellent in curability, transparency, and heat resistance.

Still another object of the invention of the present disclosure is to provide an optical member including a cured product excellent in transparency and heat resistance.

In the present specification, the "product" means a form that can be industrially produced and can be distributed to the market and does not mean a chemical entity itself. In that sense, the "product" is a composition containing the target entity as a main component (in other words, containing the target entity nearly 100 wt. %).

Solution to Problem

As a result of diligent research to solve the problems described above, the present inventors have found that perhydrogenated products and isomers in certain proportions mix in an alicyclic epoxy compound product containing a compound represented by Formula (1) as a main component. The present inventors also have found that perhydrogenated products and isomers mixing in the product reduces the curability of the product and further reduces the transparency of the resulting cured product.

Furthermore, as the method for producing the compound represented by Formula (1), a method of subjecting a reaction product of a compound represented by Formula (1') with an organic peracid to a solvent removal treatment and a removal treatment of a high-boiling fraction has been known in the art. The present inventers have found that the method above has a difficulty in removing perhydrogenated products and isomers having a boiling point extremely close to that of the compound represented by Formula (1), and that the perhydrogenated products and isomers can be efficiently removed by introducing the reaction product above into a rectification column and fractionally distilling the reaction product under certain distillation conditions. The invention of the present disclosure was completed based on these findings.

That is, an embodiment of the invention of the present disclosure provides an alicyclic epoxy compound product, in which a purity of a compound represented by Formula (1) is 85 wt. % or higher; and a total content of a compound represented by Formula (a) and a compound represented by Formula (b) is 0.5 wt. % or less:

[Chem. 1]

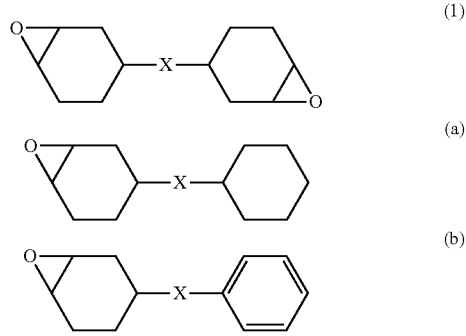

where X represents a single bond or a linking group.

An embodiment of the invention of the present disclosure also provides the alicyclic epoxy compound product described above, in which a total content of a compound represented by Formula (c) and a compound represented by Formula (d) is 10 wt. % or less:

[Chem. 2]

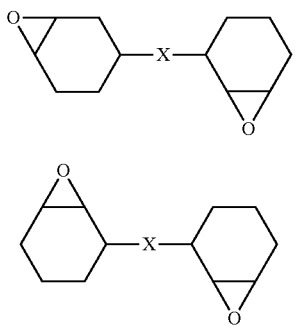

(c)

(d)

where X represents a single bond or a linking group.

An embodiment of the invention of the present disclosure also provides the alicyclic epoxy compound product described above, in which a content of a compound represented by Formula (x) is 1000 ppm or less:

[Chem. 3]

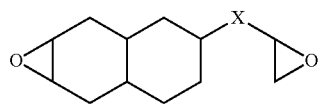

(x)

where X represents a single bond or a linking group.

An embodiment of the invention of the present disclosure also provides the alicyclic epoxy compound product described above, in which thermal gelation time determined by a measurement method below is 400 seconds or shorter:
Gelation Time Measurement Method:

A curable composition formed by blending 0.6 parts by weight of SAN-AID SI-100L available from Sanshin Chemical Industry Co., Ltd. to 100 parts by weight of the alicyclic epoxy compound product is subjected to dynamic viscoelasticity measurement under conditions of a frequency of 1 Hz, a strain of 5%, a gap of 0.2 mm, and a temperature of 80° C., and a point of intersection of a storage modulus (G') and a loss modulus (G") is taken as the thermal gelation time.

An embodiment of the invention of the present disclosure also provides the alicyclic epoxy compound product described above, in which UV gelation time determined by a measurement method below is 45 seconds or shorter:
Gelation Time Measurement Method:

A curable composition formed by blending 1.0 parts by weight of CPI-101A available from San-Apro Ltd. to 100 parts by weight of the alicyclic epoxy compound product and subjected to UV irradiation at 10 mW/cm² for 10 seconds under conditions of a frequency of 10 Hz, a strain of 5%, a gap of 0.1 mm, and 25° C. is subjected to dynamic viscoelasticity measurement, and a point of intersection of a storage modulus (G') and a loss modulus (G") is taken as the thermal gelation time.

An embodiment of the invention of the present disclosure also provides a method for producing an alicyclic epoxy compound product, in which the alicyclic epoxy compound product described above is obtained through:

(1) subjecting a compound represented by Formula (1") to a dehydration reaction to obtain a compound represented by Formula (1'):

[Chem. 4]

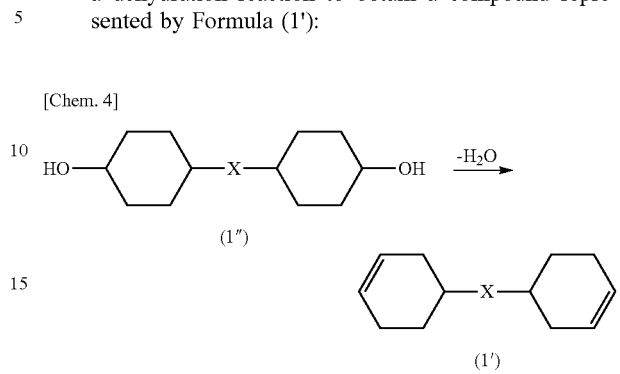

(1")

(1')

where X represents a single bond or a linking group.

(2) reacting the compound represented by Formula (1') with an organic peracid to obtain a reaction product containing a compound represented by Formula (1):

[Chem. 5]

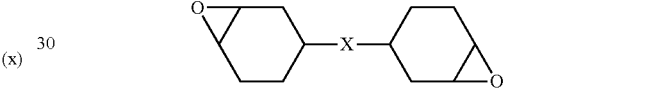

(1)

where X is the same as described above; and (3) fractionally distilling the reaction product using a rectification column with a number of actual plates from 1 to 20 under conditions below:
a column bottom temperature of 100 to 250° C.,
a column top temperature of 80 to 200° C.,
a column top pressure from 0.1 to 50 mmHg, and
a column bottom pressure from 1 to 200 mmHg.

An embodiment of the invention of the present disclosure also provides the method for producing an alicyclic epoxy compound product described above, in which a compound represented by Formula (a) and a compound represented by Formula (b) are removed by the fractional distillation in (3):

[Chem. 6]

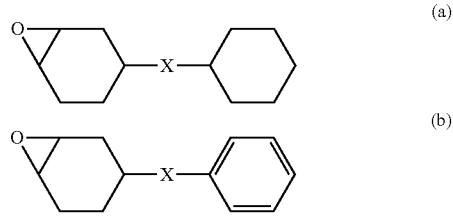

(a)

(b)

where X represents a single bond or a linking group.

An embodiment of the invention of the present disclosure also provides a curable composition containing the alicyclic epoxy compound product described above.

An embodiment of the invention of the present disclosure also provides the curable composition described above, further containing a curing agent (B) and a curing accelerator (C).

An embodiment of the invention of the present disclosure also provides the curable composition described above, further containing a curing catalyst (D).

An embodiment of the invention of the present disclosure also provides a cured product of the curable composition described above.

An embodiment of the invention of the present disclosure also provides the cured product described above, in which a light transmittance at a wavelength of 400 nm is 50% or greater.

An embodiment of the invention of the present disclosure also provides an encapsulant containing the curable composition described above.

An embodiment of the invention of the present disclosure also provides an adhesive containing the curable composition described above.

An embodiment of the invention of the present disclosure also provides a coating agent containing the curable composition described above.

An embodiment of the invention of the present disclosure also provides an optical member including the cured product described above.

Advantageous Effects of Invention

The alicyclic epoxy compound product of the present disclosure is highly pure and extremely low in the content of certain impurities (e.g., a perhydrogenated product and preferably a perhydrogenated product and isomer). Thus, the curable composition obtained by adding a curing agent or a curing catalyst to the alicyclic epoxy compound product of the present disclosure has extremely excellent curability, and the resulting cured product is excellent in transparency and heat resistance. Thus, the alicyclic epoxy compound product of the present disclosure can be suitably used in industrial applications (e.g., such as encapsulants, adhesives, coating agents, or their raw materials).

DESCRIPTION OF EMBODIMENTS

Alicyclic Epoxy Compound Product

Figure 1:
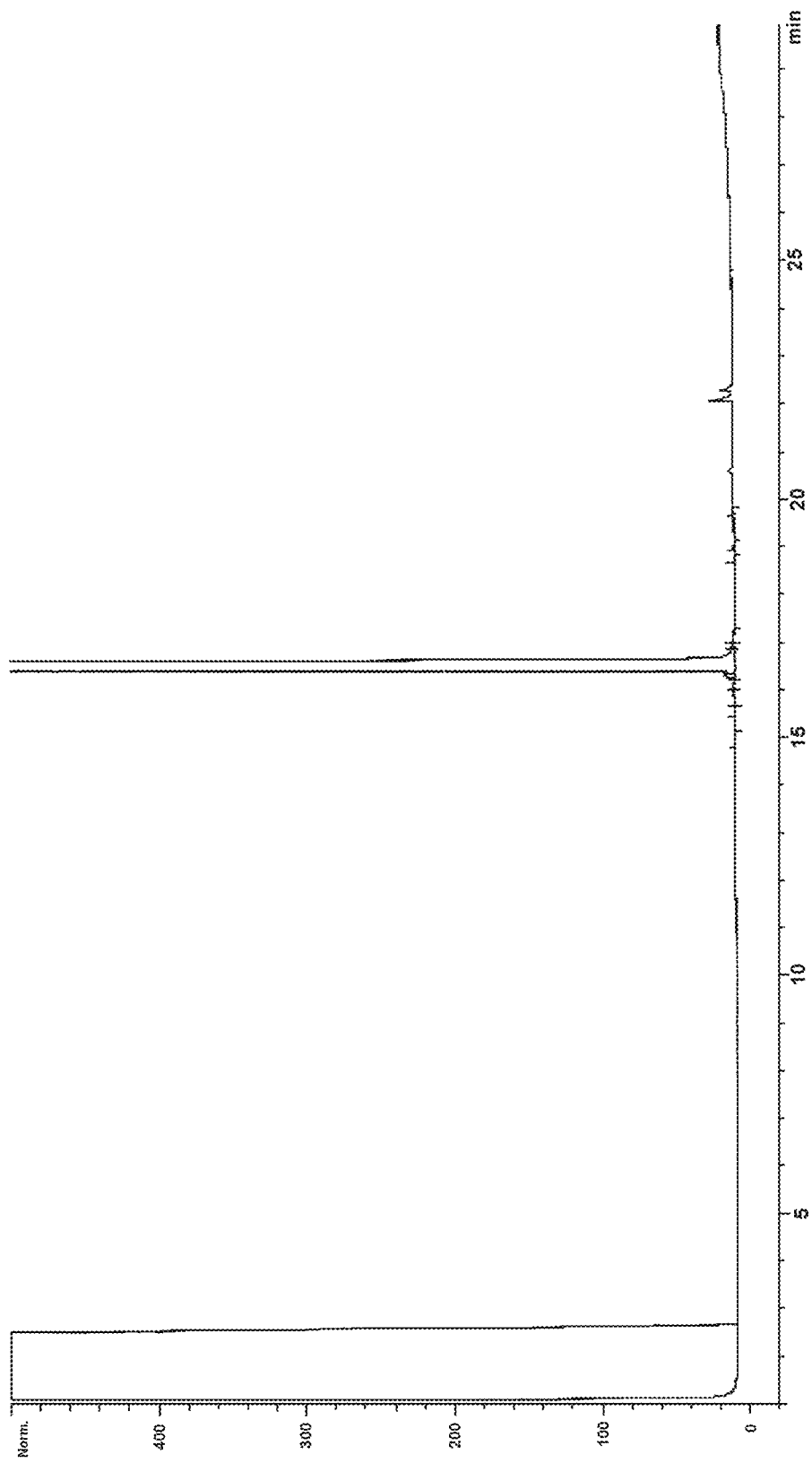
FIG. 1 is a diagram showing a gas chromatograph measurement result of an alicyclic epoxy compound product (6) obtained in Example 1.

An alicyclic epoxy compound product of the present disclosure contains a compound represented by Formula (1) below, and its purity (or content) is 85 wt. % or greater. The purity (or content) of the compound represented by Formula (1) is preferably at 90 wt. % or greater and particularly preferably 95 wt. % or greater in that a cured product excellent in curability, transparency, and heat resistance can be obtained.

[Chem. 7]

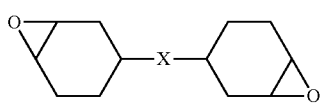

(1)

In Formula (1) above, X represents a single bond or a linking group (a divalent group having one or more atoms). Examples of the linking group include divalent hydrocarbon groups, alkenylene groups in which one, some, or all carbon-carbon double bond(s) is/are epoxidized, ether bonds, and groups in which a plurality of these is linked. In Formula (1), a substituent (e.g., such as a $C_{1-3}$ alkyl group) may be bonded to a cyclohexene oxide group.

Representative examples of the compound represented by Formula (1) above include (3,4,3',4'-diepoxy)bicyclohexyl, bis(3,4-epoxycyclohexylmethyl)ether, 1,2-epoxy-1,2-bis(3,4-epoxycyclohexan-1-yl)ethane, 2,2-bis(3,4-epoxycyclohexan-1-yl)propane, and 1,2-bis(3,4-epoxycyclohexan-1-yl)ethane.

In addition, the alicyclic epoxy compound product has a total content of a compound represented by Formula (a) below and a compound represented by Formula (b) below of 0.5 wt. % or less, preferably 0.1 wt. % or less, and particularly preferably less than 0.05 wt. %. The lower limit of the total content of the compound represented by Formula (a) below and the compound represented by Formula (b) below is, for example, 0.01 wt. %. X in the formulae below is the same as described above.

[Chem. 8]

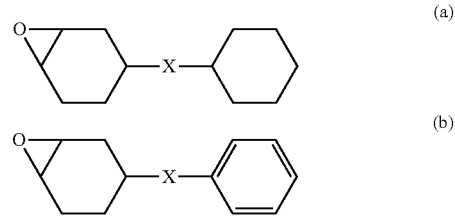

Furthermore, the alicyclic epoxy compound product has a total content of a compound represented by Formula (c) below and a compound represented by Formula (d) below of preferably 10 wt. % or less, more preferably 5 wt. % or less, and particularly preferably 3 wt. % or less. X in the formulae below is the same as described above.

[Chem. 9]

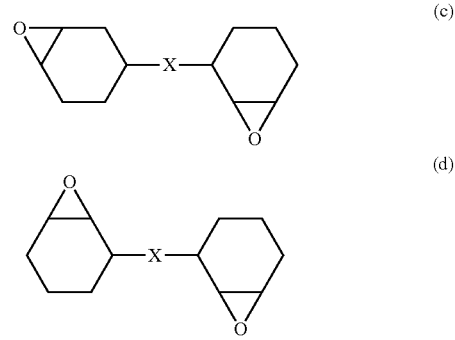

As described above, the alicyclic epoxy compound product contains the compound represented by Formula (1) in high purity, and each content of the compounds represented by Formulae (a) to (d) above is extremely low.

Thus, the alicyclic epoxy compound product is excellent in curability, and thermal gelation time determined by a measurement method below is, for example, 400 seconds or shorter, preferably 350 seconds or shorter, particularly preferably 300 seconds or shorter, and most preferably 250 seconds or shorter.

Gelation Time Measurement Method:

A thermosetting composition formed by blending 0.6 parts by weight of SAN-AID SI-100L available from Sanshin Chemical Industry Co., Ltd. to 100 parts by weight of the alicyclic epoxy compound product is subjected to dynamic viscoelasticity measurement under conditions of a frequency of 1 Hz, a strain of 5%, a gap of 0.2 mm, and a temperature of 80° C., and a point of intersection of a storage modulus (G') and a loss modulus (G") is taken as the thermal gelation time.

In addition, the alicyclic epoxy compound product is excellent in curability, and UV gelation time determined by a measurement method below is, for example, 45 seconds or shorter, preferably 40 seconds or shorter, more preferably 35 seconds or shorter, particularly preferably 30 seconds or shorter, most preferably 25 seconds or shorter, and especially preferably 20 seconds or shorter.

Gelation Time Measurement Method:

A UV-curable composition formed by blending 1.0 parts by weight of CPI-101A available from San-Apro Ltd. to 100 parts by weight of the alicyclic epoxy compound product and subjected to UV irradiation at 10 mW/cm² for 10 seconds under conditions of a frequency of 10 Hz, a strain of 5%, a gap of 0.1 mm, and 25° C. is subjected to dynamic viscoelasticity measurement, and a point of intersection of a storage modulus (G') and a loss modulus (G") is taken as the thermal gelation time.

Thus, the alicyclic epoxy compound product can be suitably used as a raw material, for example, for encapsulants, adhesives, coating agents, electrical insulation materials, laminated plates, inks, sealants, resists, composite materials, transparent substrates, transparent sheets, transparent films, optical elements, optical lenses, optical shaping, electronic paper, touch screens, solar cell substrates, optical waveguides, light guiding plates, and holographic memories.

Method for Producing Alicyclic Epoxy Compound Product

The alicyclic epoxy compound product of the present disclosure can be produced through the following:

(1) subjecting a compound represented by Formula (1") to a dehydration reaction to obtain a compound represented by Formula (1') (dehydration);

(2) reacting the compound represented by Formula (1') with an organic peracid to obtain a reaction product containing a compound represented by Formula (1') (epoxidation); and (3) fractionally distilling the reaction product using a rectification column (fractional distillation).

The method for producing the alicyclic epoxy compound product may include an additional process in addition to (1) to (3) above. Examples of the additional process include (2-1), (2-2), and (2-3) below. These processes are preferably included between (2) and (3) (after completion of (2) and before (3)), and of these processes, (2-1) is preferably included first. The next process to (2-1) may be either (2-2) or (2-3).

(2-1) washing the resulting reaction product with water to remove the organic peracid used in the reaction and its decomposition product (water washing);

(2-2) removing a solvent from the reaction product (solvent removal); and (2-3) removing a high-boiling fraction from the reaction product (removal of a high-boiling fraction).

The method for producing the alicyclic epoxy compound product is preferably performed, among others, in the order of (1) dehydration, (2) epoxidation, (2-1) water washing, (2-2) solvent removal, (2-3) removal of a high-boiling fraction, and (3) fractional distillation in that the method can provide an alicyclic epoxy compound product having particularly excellent curability and capable of forming a cured product excellent in transparency and heat resistance.

Dehydration

The dehydration is a process to obtain a compound represented by Formula (1') below by a method (method 1) of intramolecular dehydration from a compound represented by Formula (1") below using the compound represented by Formula (1") below as a raw material. X in the formula below is the same as described above.

[Chem. 10]

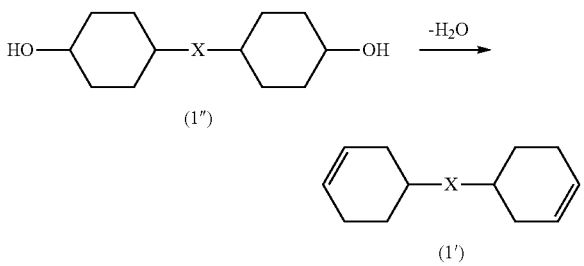

The intramolecular dehydration reaction of the compound represented by Formula (1") can be performed, for example, by heating at 100 to 200° C. in the presence of an acid catalyst, such as concentrated sulfuric acid.

The compound represented by Formula (1') can be produced by Diels-Alder reaction represented by the formula below (method 2). In the formula below, X represents a single bond or a linking group.

[Chem. 11]

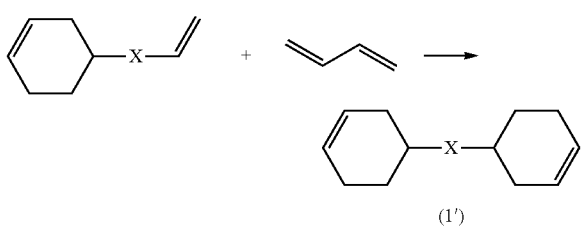

However, the reaction product obtained using the compound represented by Formula (1') obtained in method 2 inevitably contains a compound represented by Formula (x) below together with the compound represented by Formula (1). In addition, the compound represented by Formula (x) below cannot be easily removed by water washing, distillation, or the like and thus is contained in the final product, the alicyclic epoxy compound product. The compound represented by Formula (x) when contained in the alicyclic epoxy compound product tends to decrease reactivity; thus, this is not preferred. X in the formulae below is the same as described above.

[Chem. 12]

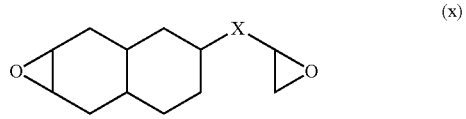

(x)

where X represents a single bond or a linking group.

On the other hand, reaction of the compound represented by Formula (1') obtained in the method 1 above with an organic peracid does not produce the compound represented by Formula (x) above as a byproduct.

In an embodiment of the invention of the present disclosure, the method 1 described above is employed, thus this can reduce the content of the compound represented by Formula (x) in the alicyclic epoxy compound product, for example, to 1000 ppm or less (preferably 500 ppm or less, particularly preferably 100 ppm or less, and most preferably 50 ppm or less) and provides an alicyclic epoxy compound product with good reactivity.

Epoxidation

The epoxidation is a process to react the compound represented by Formula (1') obtained through the dehydration with an organic peracid to obtain a reaction product. Through this process, a reaction product containing the compound represented by Formula (1) below is obtained. X in the formula below is the same as described above.

[Chem. 13]

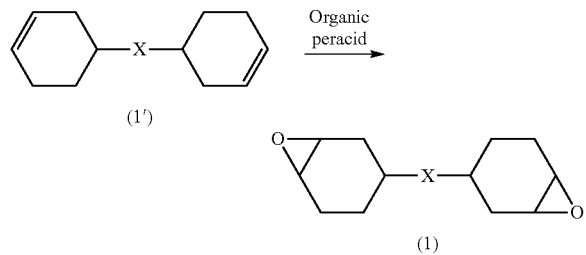

The organic peracid is preferably at least one selected from, for example, performic acid, peracetic acid, perpropionic acid, m-chloroperbenzoic acid, trifluoroperacetic acid, and perbenzoic acid.

The amount of the organic peracid to be used is, for example, from 0.5 to 3 mol per mol of the compound represented by Formula (1).

The epoxidation reaction can be performed in the presence of a solvent. Examples of the solvent include aromatic hydrocarbons, such as benzene, toluene, xylene, ethylbenzene, isopropylbenzene, diethylbenzene, and p-cymene; alicyclic hydrocarbons such as cyclohexane, decalin, and the like; aliphatic hydrocarbons, such as n-hexane, heptane, octane, nonane, and decane; alcohols, such as cyclohexanol, hexanol, heptanol, octanol, nonanol, furfuryl alcohol; ketones, such as acetone, methyl ethyl ketone, and cyclohexanone; esters, such as ethyl acetate, n-amyl acetate, cyclohexyl acetate, isoamyl propionate, and methyl benzoate; polyhydric alcohols and their derivatives, such as ethylene glycol, propylene glycol, ethylene glycol monomethyl ether, ethylene glycol monomethyl ether acetate, ethylene glycol monoethyl ether, ethylene glycol monoethyl ether acetate, diethylene glycol monomethyl ether, and diethylene glycol monoethyl ether; halogen compounds, such as chloroform, dimethyl chloride, carbon tetrachloride, and chlorobenzene; and ethers, such as 1,2-dimethoxyethane. One of these can be used alone or two or more in combination.

The amount of the solvent to be used is, for example, approximately from 0.2 to 10 times by weight that of the compound represented by Formula (1).

In the epoxidation reaction, a stabilizer for the organic peracid (e.g., such as ammonium hydrogen phosphate, potassium pyrophosphate, or 2-ethylhexyl tripolyphosphate), a polymerization inhibitor (e.g., hydroquinone, piperidine, ethanolamine, or phenothiazine), or the like can also be used as necessary.

The reaction temperature of the epoxidation reaction is, for example, from 0 to 70° C. The reaction atmosphere is not particularly limited as long as it does not inhibit the reaction and may be, for example, any of an air atmosphere, a nitrogen atmosphere, and an argon atmosphere.

Water Washing

The water washing is a process to remove organic acids, which are the organic peracid and its decomposition product contained in the reaction product obtained through the epoxidation, by water washing.

The amount of water to be used is, for example, approximately from 0.1 to 3 times (v/v) that of the reaction product. An equilibrium extractor, such as a mixer-settler type; an extraction column; a centrifugal extractor; or the like can be used for the water washing.

Solvent Removal

The solvent removal is a process to remove a component (e.g., such as a solvent or moisture) contained in the reaction product, the component with a boiling point lower than that of the compound represented by Formula (1). Subjecting the reaction product to this process can reduce the content of a compound mixing in the alicyclic epoxy compound product, the compound with a molecular weight less than that of the compound represented by Formula (1), and can increase the purity of the compound represented by Formula (1).

In the solvent removal, a thin film evaporator or distillation column can be used. The distillation is preferably performed under conditions of a heating temperature ranging from 50 to 200° C. and a pressure ranging from 1 to 760 mmHg.

In the solvent removal, a component with a boiling point lower than that of the compound represented by Formula (1) is evaporated and removed from the reaction product, and this provides a mixture of the compound represented by Formula (1) and a component with a boiling point higher than that of the compound represented by Formula (1) as a bottom liquid.

Removal of High-Boiling Fraction

The removal of a high-boiling fraction is a process to evaporate and distill the compound represented by Formula (1) from a mixture of the compound represented by Formula (1) and a component with a boiling point higher than that of the compound represented by Formula (1), the mixture being a bottom liquid obtained through the solvent removal. Subjecting the bottom liquid to this process can reduce the content of a compound mixing in the alicyclic epoxy compound product, the compound with a molecular weight greater than that of the compound represented by Formula (1), and can increase the purity of the compound represented by Formula (1).

In the removal of a high-boiling fraction, a thin film evaporator or distillation column can be used. The distillation is preferably performed under conditions of a heating temperature ranging from 100 to 200° C. and a pressure ranging from 0.01 to 100 mmHg.

Preferably, the bottom liquid is introduced into a distillation column, the compound represented by Formula (1) is collected as a column top distillate, and a column bottom liquid containing a high-boiling point component is discharged out of the system.

Fractional Distillation

The fractional distillation is a process to separate and remove impurities produced as byproducts in the dehydration [in particular, components with a boiling point lower than that of the compound represented by Formula (1) (e.g., the compounds represented by Formulae (a) and (b))] from the main component, the compound represented by Formula (1).

For example, when the method 1 is employed in the dehydration, compounds represented by Formulae (a) to (d) mix in as by-products, but through this process, the by-products (in particular, compounds represented by Formulae (a) and (b) (i.e., perhydrogenated products)) can be separated and removed from the compound represented by Formula (1), and this provides an alicyclic epoxy compound product containing the compound represented by Formula (1) in high purity with reduced contents of the by-products (in particular, perhydrogenated products).

In the fractional distillation, a rectification column with a number of actual plates, for example, from 1 to 20 (preferably of 5 to 15 and particularly preferably of 8 to 12) is preferably used in that this can improve the separation efficiency of the by-products (in particular, perhydrogenated products), can further separate and remove the compounds represented by Formulae (c) and (d) (i.e., isomers), and further improve the purity of the product.

The column bottom temperature is, for example, from 100 to 250° C. and preferably from 130 to 170° C.

The column top temperature is, for example, from 80 to 200° C. and preferably from 100 to 120° C.

The column top pressure is, for example, from 0.1 to 50 mmHg and preferably from 0.1 to 1 mmHg.

The column bottom pressure is, for example, from 1 to 200 mmHg and preferably from 1 to 5 mmHg.

The reflux ratio is, for example, preferably within a range from 0.5 to 5. With the reflux ratio exceeding the range, the energy cost would tend to increase, and in contrast, with the reflux ratio below the range, the removal efficiency for the compounds represented by Formulae (a) to (d) would decrease, and these compounds would tend to mix in the product.

Then, through the fractional distillation, an alicyclic epoxy compound product with reduced contents of the by-products (in particular, perhydrogenated products) is obtained. When the product is collected, for example, by a batch fractional distillation, the distillate is collected in a plurality of fractions, and fractions with low contents of the by-products (in particular, perhydrogenated products) are combined as a product. The contents of perhydrogenated products and isomers in the distillate can be measured utilizing gas chromatography or the like. In addition, when the product is collected by a continuous fractional distillation, a low-boiling point component is removed from the column top, the bottom liquid obtained from the column bottom is collected, and this may be obtained as a product; or a low-boiling point component is removed from the column top, a high-boiling point component is removed from the column bottom, and a product may be collected from the side stream.

Curable Composition

A curable composition of the present disclosure contains the alicyclic epoxy compound product described above.

The curable composition contains, as a curable compound (A), the alicyclic epoxy compound product described above, but may contain one or two or more additional curable compounds in addition to the alicyclic epoxy compound product. Examples of the additional curable compound include cationic polymerizable compounds, such as epoxy compounds other than the compound represented by Formula (1) (i.e., other epoxy compounds), oxetane compounds, and vinyl ether compounds.

A proportion of the compound represented by Formula (1) in a total amount (100 wt. %) of the curable compound (A) contained in the curable composition is, for example, 50 wt. % or greater (e.g., from 50 to 100 wt. %), preferably 60 wt. % or greater, particularly preferably 70 wt. % or greater, and most preferably 80 wt. % or greater.

The curable composition preferably contains, together with the curable compound (A), a curing agent (B), a curing accelerator (C), or a curing catalyst (D).

A proportion of a total content of the curable compound (A), the curing agent (B), and the curing accelerator (C) in a total amount of the curable composition is, for example, 60 wt. % or greater, preferably 70 wt. % or greater, particularly preferably 80 wt. % or greater, most preferably 90 wt. % or greater, and especially preferably 95 wt. % or greater.

In addition, a proportion of a total content of the curable compound (A) and the curing catalyst (D) in the total amount of the curable composition is, for example, 60 wt. % or greater, preferably 70 wt. % or greater, particularly preferably 80 wt. % or greater, most preferably 90 wt. % or greater, and especially preferably 95 wt. % or greater.

Thus, a content of a compound other than the curable compound (A), the curing agent (B), the curing accelerator (C), and the curing catalyst (D) in the total amount of the curable composition is, for example, 50 wt. % or less, preferably 40 wt. % or less, more preferably 30 wt. % or less, particularly preferably 20 wt. % or less, most preferably 10 wt. % or less, and especially preferably 5 wt. % or less.

Curing Agent (B)

Examples of the curing agent (B) that can be used include curing agents well-known or commonly used as curing agents for epoxy resins, such as acid anhydrides (acid anhydride-based curing agents), amines (amine-based curing agents), polyamide resins, imidazoles (imidazole-based curing agents), polymercaptans (polymercaptane-based curing agents), phenols (phenol-based curing agents), polycarboxylic acids, dicyandiamides, and organic acid hydrazides. One of these can be used alone or two or more in combination.

Examples of the acid anhydrides include methyltetrahydrophthalic anhydrides (such as 4-methyltetrahydrophthalic anhydride and 3-methyltetrahydrophthalic anhydride), methylhexahydrophthalic anhydride (such as 4-methylhexahydrophthalic anhydride and 3-methylhexahydrophthalic anhydride), dodecenyl succinic anhydride, methyl endomethylene tetrahydrophthalic anhydride, phthalic anhydride, maleic anhydride, tetrahydrophthalic anhydride, hexahydrophthalic anhydride, methylcyclohexene dicarboxylic anhydride, pyromellitic anhydride, trimellitic anhydride, benzophenone tetracarboxylic anhydride, nadic anhydride, methylnadic anhydride, hydrogenated methylnadic anhydride, 4-(4-methyl-3-pentenyl)tetrahydrophthalic anhydride, succinic anhydride, adipic anhydride, sebacic anhydride, dodecanedioic anhydride, methylcylohexene tetracarboxylic anhydride, vinyl ether-maleic anhydride copolymers, and alkyl styrene-maleic anhydride copolymers. Among others, from the viewpoint of handleability, acid anhydrides that are liquid at 25° C. (e.g., such as methyltetrahydrophthalic anhydride, methylhexahydrophthalic anhydride, dodecenyl succinic anhydride, and methyl endomethylene tetrahydrophthalic anhydride) are preferred.

Examples of the amines include aliphatic polyamines, such as ethylenediamine, diethylenetriamine, tri ethylenetetramine, tetraethylenepentamine, dipropylenediamine, diethylaminopropylamine, and polypropylenetriamine; alicyclic polyamines, such as menthenediamine, isophoronediamine, bis(4-amino-3-methyldicyclohexyl)methane, diaminodicyclohexylmethane, bis(aminomethyl)cyclohexane, N-aminoethyl piperazine, and 3,9-bis(3-aminopropyl)-3,4,8,10-tetraoxaspiro[5,5]undecane; mononuclear polyamines, such as m-phenylenediamine, p-phenylenediamine, tolylene-2,4-diamine, tolylene-2,6-diamine, mesitylene-2,4-diamine, 3,5-diethyltolylene-2,4-diamine, and 3,5-diethyltolylene-2,6-diamine; and aromatic polyamines, such as biphenylenediamine, 4,4-diaminodiphenylmethane, 2,5-naphtylenediamine, and 2,6-naphtylenediamine.

Examples of the polyamide resins include polyamide resins having either one of a primary amino group or a secondary amino group or both in the molecule.

Examples of the imidazoles include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine, and 2,4-diamino-6-[2-ethyl-4-methylimidazolyl-(1)]-ethyl-s-triazine.

Examples of the polymercaptans include liquid polymercaptans and polysulfide resins.

Examples of the phenols include aralkyl resins, such as novolac phenolic resins, novolac cresol resins, p-xylylene-modified phenolic resins, and p-xylylene/m-xylylene-modified phenolic resins; terpene-modified phenolic resins; dicyclopentadiene-modified phenolic resins, and triphenolpropane.

Examples of the polycarboxylic acids include adipic acid, sebacic acid, terephthalic acid, trimellitic acid, and carboxy group-containing polyester.

The curing agent (B) is, among others, preferably an acid anhydride (acid anhydride curing agent) from the viewpoints of heat resistance and transparency of the resulting cured product, and a commercially available product can be used, such as "RIKACID MH-700 (trade name)" and "RIKACID MH-700F (trade name)" (both available from New Japan Chemical Co., Ltd.), and "HN-5500 (trade name)" (available from Hitachi Chemical Co., Ltd.).

The content (amount to be blended) of the curing agent (B) is preferably from 50 to 200 parts by weight and more preferably from 80 to 150 parts by weight relative to 100 parts by weight of a total amount of compounds having an epoxy group contained in the curable composition. More specifically, an acid anhydride, when used as the curing agent (B), is preferably used in a proportion of 0.5 to 1.5 equivalents per equivalent of epoxy groups contained in the curable composition of the present disclosure. The curing agent (B) contained in an amount of 50 parts by weight or greater enables the curing reaction to proceed sufficiently and tends to improve toughness of the resulting cured product. On the other hand, the curing agent (B) contained in an amount of 200 parts by weight or less prevents coloration and tends to provide a cured product excellent in transparency.

Curing Accelerator (C)

The curable composition of the present disclosure containing the curing agent (B) preferably further contains the curing accelerator (C). The curing accelerator (C) has an effect of accelerating the reaction rate when a compound having an epoxy group (oxiranyl group) reacts with the curing agent (B).

Examples of the curing accelerator (C) include 1,8-diazabicyclo[5.4.0]undecene-7 (DBU) or salts thereof (e.g., such as a phenol salt, an octylate salt, a p-toluene sulfonate salt, a formate salt, and a tetraphenylborate salt); 1,5-diazabicyclo[4.3.0]nonene-5 (DBN) or salts thereof (e.g., such as a phenol salt, an octylate salt, a p-toluene sulfonate salt, a formate salt, and a tetraphenylborate salt); tertiary amines, such as benzyldimethylamine, 2,4,6-tris(dimethylaminomethyl) phenol, and N,N-dimethylcyclohexylamine; imidazoles, such as 2-ethyl-4-methylimidazole and 1-cyanoethyl-2-ethyl-4-methylimidazole; phosphoric esters; phosphines, such as triphenylphosphine and tris(dimethoxy)phosphine; phosphonium compounds, such as tetraphenylphosphonium tetra(p-tolyl)borate; organometallic salts, such as zinc octylate, tin octylate, and zinc stearate; and metal chelates, such as aluminum acetylacetone complex. One of these can be used alone or two or more in combination.

As the curing accelerator (C), a commercially available product can be used, such as, for example, "U-CAT SA 506 (trade name)", "U-CAT SA 102 (trade name)", "U-CAT 5003 (trade name)", "U-CAT 18X (trade name)", and "U-CAT 12XD (trade name)" (under development) (the above available from San-Apro Ltd.); "TPP-K (trade name)" and "TPP-MK (trade name)" (the above available from Hokko Chemical Industry Co., Ltd.); and "PX-4ET (trade name)" (available from Nippon Chemical Industrial Co., Ltd.).

The content (amount to be blended) of the curing accelerator (C) is preferably from 0.01 to 5 parts by weight, more preferably from 0.02 to 3 parts by weight, and even more preferably from 0.03 to 3 parts by weight relative to 100 parts by weight of the curing agent (B). The curing accelerator (C) contained in an amount of 0.01 parts by weight or greater tends to provide a further efficient curing accelerating effect. On the other hand, curing accelerator (C) contained in an amount of 5 parts by weight or less prevents coloration and tends to provide a cured product excellent in transparency.

Curing Catalyst (D)

The curable composition of the present disclosure may contain the curing catalyst (D) in place of the curing agent (B). The curing catalyst (D) has a function to cure the curable composition by initiating and/or accelerating the curing reaction (polymerization reaction) of a cationic curable compound, such as the compound represented by Formula (1). Examples of the curing catalyst (D) include cationic polymerization initiators (such as photocationic polymerization initiators and thermal cationic polymerization initiators), which initiate polymerization by generating cationic species upon light irradiation or heat treatment; Lewis acid catalysts; Brønsted acid salts; and imidazoles. One of these can be used alone or two or more in combination.

Examples of the photocationic polymerization initiators include hexafluoroantimonate salts, pentafluorohydroxyantimonate salts, hexafluorophosphate salts, and hexafluoroalcenate salts, and more specifically include sulfonium salts (in particular, triarylsulfonium salts), such as triarylsulfonium hexafluorophosphate (e.g., such as p-phenylthiophenyl diphenylsulfonium hexafluorophosphate) and triarylsulfonium hexafluoroantimonate; iodonium salts, such as diaryliodonium hexafluorophosphate, diaryliodonium hexafluoroantimonate, bis(dodecylphenyl)iodonium tetrakis (pentafluorophenyl)borate, and iodonium [4-(4-methylphenyl-2-methylpropyl)phenyl] hexafluorophosphate; phosphonium salts, such as tetrafluorophosphonium hexafluorophosphate; and pyridinium salts, such as N-hexylpyridinium tetrafluoroborate. In addition, as the photocationic polymerization initiator, a commercially available product can be preferably used, such as, for example, "UVACURE1590 (trade name)" (available from Daicel-Cytec Co., Ltd.); "CD-1010 (trade name)", "CD-1011 (trade name)", and "CD-1012 (trade name)" (the above available from Sartomer USA); "Irgacure 264 (trade name)" (available from BASF); and "CIT-1682 (trade name)" (Nippon Soda Co., Ltd.).

Examples of the thermal cationic polymerization initiators include aryldiazonium salts, aryliodonium salts, arylsulfonium salts, and allene-ion complexes. A commercially available product can be preferably used, such as, for example, "PP-33 (trade name)", "CP-66 (trade name)", and "CP-77 (trade name)" (the above available from Adeka Corporation); "FC-509 (trade name)" (available from 3M); "UVE1014 (trade name)" (available from G.E.); "SAN-AID SI-60L (trade name)", "SAN-AID SI-80L (trade name)", "SAN-AID SI-100L (trade name)", "SAN-AID SI-110L (trade name)", and "SAN-AID SI-150L (trade name)" (the above available from Sanshin Chemical Industry Co., Ltd.); and "CG-24-61 (trade name)" (available from BASF).

Examples of the Lewis acid catalyst include $BF_3 \cdot$n-hexylamine, $BF_3 \cdot$monoethylamine, $BF_3 \cdot$benzylamine, $BF_3 \cdot$diethylamine, $BF_3 \cdot$pyperidine, $BF_3 \cdot$triethylamine, $BF_3 \cdot$aniline, $BF_4 \cdot$n-hexylamine, $BF_4 \cdot$monoethylamine, $BF_4 \cdot$benzylamine, $BF_4 \cdot$diethylamine, $BF_4 \cdot$pyperidine, $BF_4 \cdot$triethylamine, $BF_4 \cdot$aniline, $PF_5 \cdot$ethylamine, $PF_5 \cdot$isopropylamine, $PF_5 \cdot$butylamine, $PF_5 \cdot$laurylamine, $PF_5 \cdot$benzylamine, and $AsF_5 \cdot$laurylamine.

Examples of the Brønsted acid salt include aliphatic sulfonium salts, aromatic sulfonium salts, iodonium salts, and phosphonium salts.

Examples of the imidazoles include 2-methylimidazole, 2-ethyl-4-methylimidazole, 2-undecylimidazole, 2-heptadecylimidazole, 2-phenylimidazole, 1-benzyl-2-methylimidazol e, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine, and 2,4-diamino-6-[2-ethyl-4-methylimidazolyl-(1)]-ethyl-s-triazine.

The content (amount to be blended) of the curing catalyst (D) is preferably from 0.01 to 5 parts by weight, more preferably from 0.02 to 4 parts by weight, and even more preferably from 0.03 to 3 parts by weight relative to 100 parts by weight of the cationic curable compound contained in the curable composition. Use of the curing catalyst (D) within the above range increases the curing rate of the curable composition and tends to improve the heat resistance and transparency of the cured product in a well-balanced manner.

The curable composition of the present disclosure may contain, in addition to the above, one or two or more additives as necessary. Examples of the additive include polyhydric alcohols, such as ethylene glycol, diethylene glycol, propylene glycol, and glycerin; antifoaming agents, leveling agents, silane coupling agents, surfactants, inorganic fillers, flame retardants, colorants, ion adsorbents, pigments, fluorescents, and release agents.

The curable composition can be prepared by stirring and mixing each component described above in a state where the component is heated as necessary. For the stirring and mixing, a well-known or commonly used stirring and mixing means can be used, for example, including a mixer of various types, such as a dissolver and a homogenizer; a kneader; a roll mill; a bead mill; and a rotation/revolution stirring apparatus. In addition, after the stirring and mixing, the mixture may be defoamed under vacuum.

The curable composition contains the alicyclic epoxy compound product and thus is excellent in curability.

The curable composition containing a thermal cationic polymerization initiator as the curing agent (B) or the curing catalyst (D) can form a cured product by heat treatment.

The heating temperature is, for example, from 80 to 180° C. In addition, the heating time is, for example, from 30 to 600 minutes. The curing conditions can be appropriately adjusted, for example, by shortening the heating time when the heating temperature is increased or increasing the heating time when the heating temperature is reduced.

On the other hand, the curable composition containing a thermal cationic polymerization initiator as the curing catalyst (D) can form a cured product by light irradiation treatment.

For light irradiation, ultraviolet light is preferably used. The wavelength of the ultraviolet light to be used is preferably from 200 to 400 nm. Preferred irradiation conditions are an illuminance from 5 to 300 $mW/cm^2$ and an irradiance from 50 to 18000 $mJ/cm^2$.

Cured Product

The cured product of the present disclosure is obtained by curing the curable composition described above.

The cured product is excellent in transparency, and the light transmittance of the cured product (thickness: 3 mm) at a wavelength of 400 nm is, for example, 50% or greater and preferably 55% or greater. The light transmittance at a wavelength of 450 nm is, for example, 75% or greater. The light transmittance at a wavelength of 550 nm is, for example, 85% or greater.

In addition, the cured product is excellent in heat resistance and has a glass transition temperature (Tg) of, for example, 300° C. or higher and preferably 340° C. or higher. Furthermore, the linear expansion coefficient ($\alpha 1$: ppm/° C.) at or below the glass transition temperature is, for example, 65 or less (e.g., from 50 to 65) and preferably 60 or less (e.g., from 50 to 60). Furthermore, the linear expansion coefficient ($\alpha 2$: ppm/° C.) at or above the glass transition temperature is, for example, 150 or less (e.g., from 110 to 150) and preferably 140 or less (e.g., from 110 to 140). The Tg, $\alpha 1$, and $\alpha 2$ can be measured by a method described in Examples.

The curable resin composition of the present disclosure can be used in various applications, such as, for example, encapsulants, adhesives, coating agents, electrical insulation materials, laminated plates, inks, sealants, resists, composite materials, transparent substrates, transparent sheets, transparent films, optical elements, optical lenses, optical shaping, electronic paper, touch screens, solar cell substrates, optical waveguides, light guiding plates, and holographic memories.

The curable composition can form a cured product excellent in transparency as described above and thus, when used as an encapsulant, a die attach paste agent, or the like of an optical semiconductor element in an optical semiconductor device, tends to further increase the light intensity emitted from the optical semiconductor device.

Encapsulant

An encapsulant of the present disclosure contains the curable composition described above. The encapsulant can be preferably used in an application to encapsulate an optical semiconductor (optical semiconductor element) in an optical semiconductor device. Use of the encapsulant can encapsulate an optical semiconductor element with a cured product (i.e., an encapsulating material) excellent in transparency and heat resistance.

The proportion of the content of the curable composition in the total amount of the encapsulant is, for example, 50 wt. % or greater, preferably 60 wt. % or greater, and particularly preferably 70 wt. % or greater. The encapsulant may consist only of the curable composition.

Adhesive

An adhesive of the present disclosure contains the curable composition described above. The adhesive can be used in applications to adhere/fix a member or the like to an adherend, in particular, in various applications requiring transparency and heat resistance, such as a die attach paste agent for adhering and fixing an optical semiconductor element to a metal electrode in an optical semiconductor device; a lens adhesive for fixing a lens of a camera or the like to an adherend or bonding lenses together; an optical film adhesive for fixing an optical film (e.g., such as a polarizer, a polarizer protective film, or a retardation film) to an adherend, bonding optical films together, or bonding an optical film with another film.

The adhesive can be preferably used particularly as a die attach paste agent (or a die bond agent). Use of the adhesive as a die attach paste agent provides an optical semiconductor device in which an optical semiconductor element is adhered to an electrode with a cured product excellent in transparency and heat resistance.

The proportion of the content of the curable composition in the total amount of the adhesive is, for example, 50 wt. % or greater, preferably 60 wt. % or greater, and particularly preferably 70 wt. % or greater. The adhesive may consist only of the curable composition.

Coating Agent

A coating agent of the present disclosure contains the curable composition described above. The coating agent can be used in various applications particularly requiring transparency and heat resistance.

The proportion of the content of the curable composition in the total amount of the coating agent of the present disclosure is, for example, 50 wt. % or greater, preferably 60 wt. % or greater, and particularly preferably 70 wt. % or greater. The coating agent may consist only of the curable composition.

Optical Member

An optical member of the present disclosure includes the cured product of the curable composition described above. Examples of the optical member includes an optical semiconductor device in which an optical semiconductor element is encapsulated with the cured product of the curable composition described above; an optical semiconductor device in which an optical semiconductor element is adhered to an electrode with the cured product of the curable composition described above; and an optical semiconductor device in which an optical semiconductor element is adhered to an electrode with the cured product of the curable composition described above, and the optical semiconductor element is encapsulated with the cured product of the curable composition described above.

The optical member has a configuration in which an optical semiconductor element is encapsulated and adhered with the cured product of the curable composition described above and thus is excellent in heat resistance and has high light extraction efficiency.

Each of the configurations, their combinations, and the like of the invention according to the present disclosure is an example, and various additions, omissions, substitutions, and changes can be made as appropriate without departing from the gist of the invention according to the present disclosure. In addition, the invention according to the present disclosure is not limited by the embodiments and is limited only by the claims.

EXAMPLES

Hereinafter, the invention of the present disclosure will be described more specifically with reference to examples, but the invention of the present disclosure is not limited by these examples.

Example 1

Dehydration

To a 3-L jacketed glass flask were charged 1000 g of 4,4'-dihydroxybicyclohexyl, 125 g of a dehydration catalyst [prepared by stirring and mixing 95 wt. % of sulfuric acid (70 g) and 1,8-diazabicyclo[5.4.0]undecene-7 (55 g)], and 1500 g of pseudocumene, and the flask was heated. Formation of water was observed about when the internal temperature exceeded 115° C. The temperature was further continuously raised to the boiling point of pseudocumene (internal temperature from 162 to 170° C.) to perform a dehydration reaction at normal pressure. The by-produced water was distilled off and discharged out of the system through a discharge pipe. Here, the dehydration catalyst was liquid under the reaction conditions and was finely dispersed in the reaction liquid. After 3 hours, almost the theoretical amount of water (180 g) was distilled off, and thus the reaction was completed. Pseudocumene was distilled off from the liquid after completion of the reaction using a 10-plate Oldershaw-type distillation column, then the remaining liquid was distilled at an internal pressure of 10 Torr (1.33 kPa) and an internal temperature of 137 to 140° C., and 731 g of 3,4,3',4'-bicyclohexenyl was obtained.

Epoxidation

To a 1-L jacketed glass flask were charged 100 g of 3,4,3',4'-bicyclohexenyl and 300 g of ethyl acetate, and 307.2 g of a solution of peracetic acid in ethyl acetate (concentration of peracetic acid: 29.2%, water content of 0.31%) was added dropwise over about 2 hours to keep the temperature in the reaction system at 30° C. as nitrogen was blown into the gas phase part. After completion of the drop-wise addition, the mixture was aged at 30° C. for 3 hours, and then the reaction was completed.

Water Washing, Solvent Removal, and Removal of High-Boiling Fraction

The resulting liquid after completion of the reaction was washed with water at 30° C., a solvent was removed at 70° C./20 mmHg in a WFE-type thin film evaporator, a high-boiling point fraction was removed at a heating temperature of 180° C. and a pressure of 4 mmHg in the WFE-type thin film evaporator, and 71.2 g of a mixture (1) containing (3,4,3',4'-diepoxy)bicyclohexyl represented by Formula (1-1) below and a perhydrogenated product represented by Formula (a-1) below and/or Formula (b-1) below, and an isomer represented by Formula (c-1) below and/or Formula (d-1) below was obtained.

[Chem. 14]

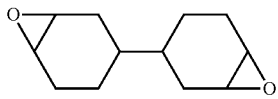
(1-1)

[Chem. 15]

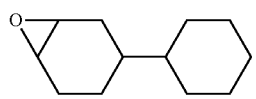
(a-1)

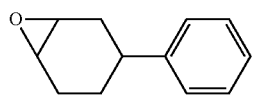
(b-1)

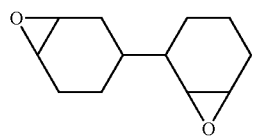
(c-1)

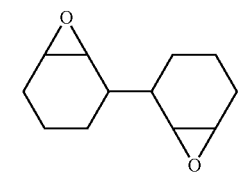
(d-1)

Fractional Distillation

To a glass batch packed column with a number of theoretical plates of 10 was charged 524 g of the resulting mixture (1), fractionally distilled under conditions below, the distillation liquid was separated into fractions each about 50 g, and collected as fractions 1 to 6 in the order of the distillation. These fractions were obtained as alicyclic epoxy compound products (1) to (6).

Fractional Distillation Conditions

Heating temperature: from 160 to 175° C.

Column bottom temperature: from 136 to 152° C.

Column top temperature: from 117 to 118° C.

Column bottom pressure: from 1.8 to 2.3 mmHg Column top pressure: from 0.6 to 0.7 mmHg Comparative Example 1

Procedures were performed in the same manner as in Example 1 except that the mixture was not subjected to the fractional distillation. That is, the mixture (1) obtained through the water washing, solvent removal, and removal of a high-boiling fraction was used as is as an alicyclic epoxy compound product (7).

The alicyclic epoxy compound products obtained in Examples and Comparative Examples were subjected to gas chromatograph measurements. The measurement result of the alicyclic epoxy compound product (6) is shown in FIG. 1, and the measurement result of the alicyclic epoxy compound product (7) in FIG. 2.

Figure 2:
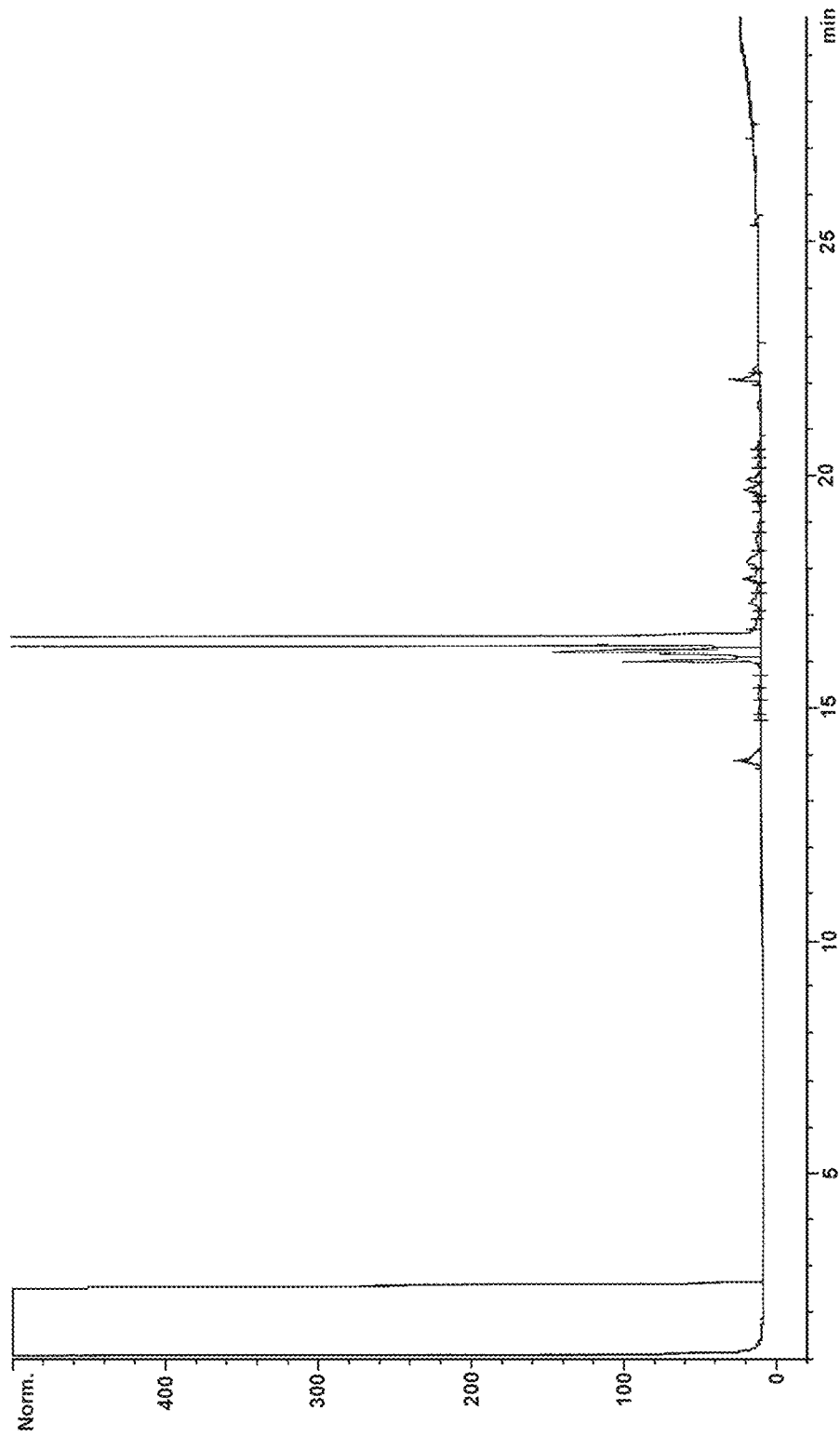
FIG. 2 is a diagram showing a gas chromatograph measurement result of an alicyclic epoxy compound product (7) obtained in Comparative Example 1.

From FIGS. 1 and 2, the fractional distillation is found to be able to efficiently remove components with a boiling point extremely close to that of (3,4,3',4'-diepoxy)bicyclohexyl. In addition, the alicyclic epoxy compound product obtained through the fractional distillation is found to contain the compound represented by Formula (1) in high purity, and the contents of the compound represented by Formula (a) and the compound represented by Formula (d) are found to be reduced to extremely low levels.

The gas chromatograph measurement of the alicyclic epoxy compound product was performed under the following conditions.

Measurement Conditions

Measurement apparatus: "HP-5 (trade name)", available from Agilent

Column packing material: (5% phenyl)methylsiloxane

Column size: 30 m in length×0.32 mm φ in inside diameter×0.25 µm in film thickness Column temperature: the temperature was increased from 60° C. at 10° C./min to 300° C. and maintained for 5 minutes Detector: FID In addition, from the gas chromatograph measurement results, the content (i.e., purity) of the main component ((3,4,3',4'-diepoxy)bicyclohexyl in the alicyclic epoxy compound product, the contents of perhydrogenated products (including the compound represented by Formula (a-1) and the compound represented by Formula (b-1)), and the contents of isomers (including the compound represented by Formula (c-1) and the compound represented by Formula (d-1)) were determined by calculating the area % of the peak of each compound.

The retention time of the main component is 16.566 minutes, the retention time of the perhydrogenated products is 13.891 minutes, and the retention times of the isomers are 16.029 minutes, 16.124 minutes, and 16.236 minutes.

From the gas chromatograph measurement results, the compound represented by Formula (x-1) below was not detected from the alicyclic epoxy compound products (1) to (7).

[Chem. 16]

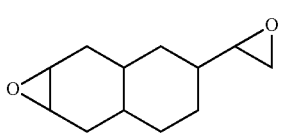
(x1)

The composition analytical results of the alicyclic epoxy compound products obtained in Example 1 and Comparative Example 1 are summarized and shown in the table below.

TABLE 1

|  |  |  | Example 1 | | | | | | | Comparative Example 1 |
| --- | --- | --- | --- | --- | --- | --- | --- | --- | --- | --- |
|  |  |  | Product (1) | Product (2) | Product (3) | Product (4) | Product (5) | Product (6) | Product (7) |
| Product | Main component | % | 89.84 | 92.78 | 96.30 | 98.04 | 99.21 | 99.64 | 92.19 |
|  | Isomer | % | 9.18 | 7.15 | 3.67 | 1.93 | 0.61 | 0.20 | 5.53 |
|  | Perhydrogenated product | % | 0.36 | <0.05 | <0.05 | <0.05 | <0.05 | <0.05 | 2.27 |

*The lower limit of "<0.05" is 0.01%

Example 2

To 100 parts by weight of the alicyclic epoxy compound product (2) obtained in Example 1, 0.6 parts by weight of "SAN-AID SI-100L (trade name)" (available from Sanshin Chemical Industry Co., Ltd.) was added as a thermal cationic polymerization initiator, uniformly mixed and defoamed using a rotation/revolution stirring device ("Awatori Rentaro AR-250 (trade name)" available from Thinky Corporation), and a thermosetting composition was obtained.

Examples 3, 4, and Comparative Example 2

Thermosetting compositions were obtained in the same manner as in Example 2 except for changing the formulations as described in Table 2 below.

The curabilities of the thermosetting compositions obtained in Examples 2 to 4 and Comparative Example 2 were evaluated by the following method.

Evaluation Method of Curability

The thermosetting composition was heated by increasing the temperature from 25° C. to 80° C. at a temperature increase rate of 5° C./min and maintaining the temperature at 80° C. for 50 minutes, and the loss modulus and storage modulus were measured using a rheometer (MCR302, available from Anton Paar GmbH) under conditions of a gap of 0.2 mm, a strain control of 5%, and a frequency of 1 Hz). Then, from the time point when the temperature reached 80° C. to the time of the point of intersection of the loss modulus and the storage modulus was taken as the thermal gelation time. The thermosetting composition with shorter thermal gelation time is excellent in curability.

The evaluation results are summarized and shown in the table below.

TABLE 2

|  |  | Example 2 | Example 3 | Example 4 | Comparative Example 2 |
| --- | --- | --- | --- | --- | --- |
| Product (2) |  | 100 | — | — | — |
| Product (4) |  | — | 100 | — | — |
| Product (6) |  | — | — | 100 | — |
| Product (7) |  | — | — | — | 100 |
| SI-100L |  | 0.6 | 0.6 | 0.6 | 0.6 |
| Thermal gelation time | s | 360 | 296 | 214 | 400 |

From Table 2, the curability is found to be improved as the contents of the perhydrogenated products and isomers in the thermosettable compositions are reduced.

Examples 5 to 9 and Comparative Example 3

Thermosetting compositions were obtained in the same manner as in Example 2 except for changing the formulations as described in Table 3 below. A cured product was obtained from each of the resulting thermosetting compositions by the following method. The resulting cured product was evaluated for heat resistance, mechanical properties, and transparency by the following methods.

Curing Method

The thermosetting composition was cast into a molding machine and heated in curing conditions of 45° C. for 6.5 hours followed by 150° C. for 2 hours, and a cured product was obtained.

Evaluation Method of Heat Resistance

Using a TMA measurement apparatus ("TMA/SS 100" available from SII Nano Technology Inc.) and by a method in accordance with JIS K7197, the cured product was heated by increasing the temperature from 30° C. to 300° C. at a temperature increase rate of 5° C./min under a nitrogen atmosphere, the thermal expansion coefficient was measured. Then, tangent lines were drawn in each of the region with a temperature lower than the glass transition point and the region with a temperature higher than the glass transition point on the TMA chart, and the glass transition temperature (Tg) was determined from the intersection point of the tangent lines.

In addition, a linear expansion coefficient $\alpha 1$ (ppm/° C.) at or below the glass transition temperature and a linear expansion coefficient $\alpha 2$ (ppm/° C.) at or above the glass transition temperature of the cured product were determined from the TMA chart. The cured product with smaller values of $\alpha 1$ and $\alpha 2$ has better dimensional stability.

Evaluation Method of Mechanical Properties

The cured product (4 mm in thickness×10 mm in width× 80 mm in length) was measured for flexural strength (MPa) and flexural modulus (MPa) by performing a three-point bending test using a Tensilon universal testing machine (available from Orientec Co., Ltd.) in conditions of an edge span of 67 mm and a bending rate of 2 mm/min.

Evaluation Method of Transparency

The cured product (thickness: 3 mm) was measured for light transmittance (%) at a wavelength of 400 nm using a spectrophotometer ("UV-2450 (trade name)" available from Shimadzu Corporation).

The evaluation results are summarized and shown in the table below.

TABLE 3

|  |  | Example 5 | Example 6 | Example 7 | Example 8 | Example 9 | Comparative Example 3 |
|---|---|---|---|---|---|---|---|
| Product (1) |  | 100 | — | — | — | — | — |
| Product (2) |  | — | 100 | — | — | — | — |
| Product (3) |  | — | — | 100 | — | — | — |
| Product (4) |  | — | — | — | 100 | — | — |
| Product (5) |  | — | — | — | — | 100 | — |
| Product (6) |  | — | — | — | — | — | — |
| Product (7) |  | — | — | — | — | — | 100 |
| SI-100L |  | 0.6 | 0.6 | 0.6 | 0.6 | 0.6 | 0.6 |
| Tg | °C. | 344 | 344 | 345 | 342 | 342 | 337 |
| α1 | ppm/°C. | 61 | 60 | 58 | 54 | 57 | 66 |
| α2 | ppm/°C. | 130 | 130 | 120 | 120 | 120 | 160 |
| Flexural strength | MPa | 43 | 47 | 39 | 45 | 40 | 36 |
| Flexural modulus | MPa | 3810 | 3875 | 3852 | 3747 | 3760 | 3443 |
| Light transmittance (wavelength: 400 μm) | % | 57.6 | 60.3 | 51.5 | 61.1 | 57.4 | 45.6 |

From Table 3, the resulting cured products with reduced content of the perhydrogenated products are found to have improved heat resistance, mechanical properties, and transparency regardless of the contents of the isomers in the thermosetting composition.

Example 10

To 100 parts by weight of the alicyclic epoxy compound product (2) obtained in Example 1, 1 part by weight of "CPI-101A (trade name)" (available from San-Apro Ltd.) was added as a photocationic polymerization initiator, uniformly blended and defoamed using a rotation/revolution stirring device ("Awatori Rentaro AR-250 (trade name)" available from Thinky Corporation), and a photocurable composition was obtained.

Examples 11 to 13 and Comparative Example 4

Thermosetting compositions were obtained in the same manner as in Example 10 except for changing the formulations as described in Table 4 below. The curabilities of the resulting photocurable compositions were evaluated by the following method.

Evaluation Method of Curability

The photocurable composition subjected to UV irradiation (irradiated at 10 mW/cm² for 10 seconds) under a condition of 25° C. was measured for loss modulus and storage modulus using a rheometer (MCR302, available from Anton Paar GmbH) under conditions of 25° C., a gap of 0.1 mm, a strain control of 5%, and a frequency of 10 Hz. Then, the time until the point of intersection of the loss modulus and the storage modulus was taken as the UV gelation time. The photocurable composition with shorter UV gelation time is excellent in curability.

The evaluation results are summarized and shown in the table below.

TABLE 4

|  |  | Example 10 | Example 11 | Example 12 | Example 13 | Comparative Example 4 |
|---|---|---|---|---|---|---|
| Product (2) |  | 100 | — | — | — | — |
| Product (4) |  | — | 100 | — | — | — |
| Product (5) |  | — | — | 100 | — | — |
| Product (6) |  | — | — | — | 100 | — |
| Product (7) |  | — | — | — | — | 100 |
| CPI-101A |  | 1 | 1 | 1 | 1 | 1 |
| UV gelation time | s | 43 | 28 | 13 | 12 | 45 |

From Table 4, the curability is found to be improved as the contents of the perhydrogenated products and isomers in the photocurable compositions are reduced.

To summarize the above, configurations and variations of the invention of the present disclosure are described below.

[1] An alicyclic epoxy compound product, in which a purity of a compound represented by Formula (1) is 85 wt. % or greater; and a total content of a compound represented by Formula (a) and a compound represented by Formula (b) is 0.5 wt. % or less.

[2] The alicyclic epoxy compound product according to [1], in which a total content of a compound represented by Formula (c) and a compound represented by Formula (d) is 10 wt. % or less.

[3] The alicyclic epoxy compound product according to [1] or [2], in which a content of a compound represented by Formula (x) is 1000 ppm or less.

[4] The alicyclic epoxy compound product according to any one of [1] to [3], in which a thermal gelation time determined by a measurement method below is 400 seconds or shorter:

Gelation Time Measurement Method:

A curable composition formed by blending 0.6 parts by weight of SAN-AID SI-100L available from Sanshin Chemical Industry Co., Ltd. to 100 parts by weight of the alicyclic epoxy compound product is subjected to dynamic viscoelasticity measurement under conditions of a frequency of 1 Hz, a strain of 5%, a gap of 0.2 mm, and a temperature of 80° C., and a point of intersection of a storage modulus (G') and a loss modulus (G") is taken as the thermal gelation time.

[5] The alicyclic epoxy compound product according to any one of [1] to [4], in which UV gelation time determined by a measurement method below is 45 seconds or shorter:

Gelation Time Measurement Method:

A curable composition formed by blending 1.0 parts by weight of CPI-101A available from San-Apro Ltd. to 100 parts by weight of the alicyclic epoxy compound product and subjected to UV irradiation at 10 mW/cm² for 10 seconds under conditions of a frequency of 10 Hz, a strain of 5%, a gap of 0.1 mm, and 25° C. is subjected to dynamic viscoelasticity measurement, and a point of intersection of a storage modulus (G') and a loss modulus (G") is taken as the thermal gelation time.

[6] A method for producing an alicyclic epoxy compound product, in which the alicyclic epoxy compound product described in any one of [1] to [5] is obtained through:

(1) subjecting a compound represented by Formula (1") to a dehydration reaction to obtain a compound represented by Formula (1');

(2) reacting the compound represented by Formula (1') with an organic peracid to obtain a reaction product containing a compound represented by Formula (1); and (3) fractionally distilling the reaction product using a rectification column with a number of actual plates of 1 to 20 under conditions below:

a column bottom temperature of 100 to 250° C.,
a column top temperature of 80 to 200° C.,
a column top pressure of 0.1 to 50 mmHg, and
a column bottom pressure of 1 to 200 mmHg.

[7] The method for producing an alicyclic epoxy compound product according to [6], in which a compound represented by Formula (a) and a compound represented by Formula (b) are removed by the fractional distillation in (3).

[8] The method for producing an alicyclic epoxy compound product according to [6] or [7], the method further including distilling the reaction product in conditions of a temperature of 50 to 200° C. and a pressure of 1 to 760 mmHg to remove a compound with a molecular weight less than that of the compound represented by Formula (1).

[9] The method for producing an alicyclic epoxy compound product according to any one of [6] to [8], the method further including distilling the reaction product in conditions of a temperature of 100 to 200° C. and a pressure from 0.01 to 100 mmHg to evaporate and collect the compound represented by Formula (1) and to remove a component with a boiling point higher than that of the compound represented by Formula (1).

[10] A curable composition containing the alicyclic epoxy compound product described in any one of [1] to [5].

[11] The curable composition according to [10], further containing a curing agent (B) and a curing accelerator (C).

[12] The curable composition according to [10], further containing a curing catalyst (D).

[13] A cured product of the curable composition described in any one of [10] to [12].

[14] The cured product according to [13], in which a light transmittance at a wavelength of 400 nm is 50% or greater.

[15] An encapsulant containing the curable composition described in any one of [10] to [12].

[16] An adhesive containing the curable composition described in any one of [10] to [12].

[17] A coating agent containing the curable composition described in any one of [10] to [12].

[18] An optical member including the cured product described in [13] or [14].

[19] A method for producing an encapsulant using a curable composition containing the alicyclic epoxy compound product described in any one of [1] to [5].

[20] A method for producing an adhesive using a curable composition containing the alicyclic epoxy compound product described in any one of [1] to [5].

[21] A method for producing a coating agent using a curable composition containing the alicyclic epoxy compound product described in any one of [1] to [5].

[22] Use of a curable composition containing the alicyclic epoxy compound product described in any one of [1] to [5] as an encapsulant.

[23] Use of a curable composition containing the alicyclic epoxy compound product described in any one of [1] to [5] as an adhesive.

[24] Use of a curable composition containing the alicyclic epoxy compound product described in any one of [1] to [5] as a coating agent.

The invention claimed is:

1. An alicyclic epoxy compound product, wherein a purity of a compound represented by Formula (1) which is present in the product in an amount of 85 wt. % or greater based on a total weight of alicyclic epoxy compound; and a total content of a compound represented by Formula (a) and a compound represented by Formula (b) based on the total weight of alicyclic epoxy compound is from 0.5 wt % or less:

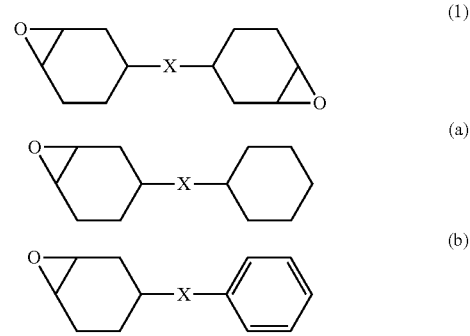

wherein X of formula (1), (a) or (b) represents a single bond, wherein the alicyclic epoxy compound product is made by:

(1) subjecting a compound represented by Formula (1") to a dehydration reaction to obtain a compound represented by Formula (1'):

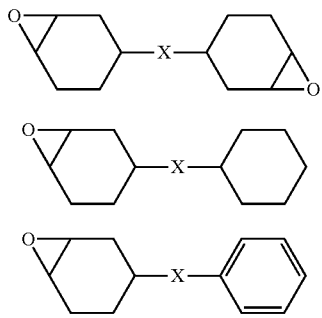

wherein X of formula (1″) or (1′) represents a single bond;

(2) reacting the compound represented by Formula (1′) with an organic peracid to obtain a reaction product containing the compound represented by Formula (1); and (3) fractionally distilling the reaction product using a rectification column with a number of actual plates from 1 to 20 under the conditions below:
a column bottom temperature of 100 to 250° C.,
a column top temperature of 80 to 200° C.,
a column top pressure from 0.1 to 50 mmHg, and
a column bottom pressure from 1 to 200 mmHg.

2. The alicyclic epoxy compound product according to claim 1, wherein a total content of a compound represented by Formula (c) and a compound represented by Formula (d) is 10 wt. % or less:

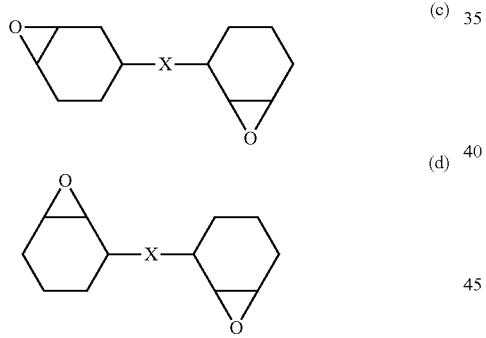

wherein X of formula (c) or (d) represents a single bond.

3. The alicyclic epoxy compound product according to claim 1, wherein a content of a compound represented by Formula (x) is 1000 ppm or less:

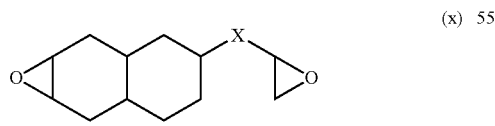

wherein X of formula (x) represents a single bond.

4. The alicyclic epoxy compound product according to claim 1, wherein thermal gelation time determined by a measurement method is 400 seconds or shorter:
gelation time measurement method:
a curable composition formed by blending 0.6 parts by weight of dibenzylmethyl-p-hydroxyphenylsulfonium hexafluoroantimonate to 100 parts by weight of the alicyclic epoxy compound product is subjected to dynamic viscoelasticity measurement under conditions of a frequency of 1 Hz, a strain of 5%, a gap of 0.2 mm, and a temperature of 80° C., and a point of intersection of a storage modulus (G') and a loss modulus (G") is taken as the thermal gelation time.

5. The alicyclic epoxy compound product according to claim 1, wherein UV gelation time determined by a measurement method is 45 seconds or shorter:
gelation time measurement method:
a curable composition formed by blending 1.0 parts by weight of 4-(phenylthio) phenyldiphenylsulfonium hexafluoroantimonate to 100 parts by weight of the alicyclic epoxy compound product and subjected to UV irradiation at 10 mW/cm² for 10 seconds under conditions of a frequency of 10 Hz, a strain of 5%, a gap of 0.1 mm, and 25° C. is subjected to dynamic viscoelasticity measurement, and a point of intersection of a storage modulus (G') and a loss modulus (G") is taken as the thermal gelation time.

6. A method for producing an alicyclic epoxy compound product, wherein a compound represented by Formula (1) which is present in the product is in an amount of 85 wt. % or greater based on a total weight of alicyclic epoxy compound; and a total content of a compound represented by Formula (a) and a compound represented by Formula (b) based on the total weight of alicyclic epoxy compound is 0.5 wt. % or less:

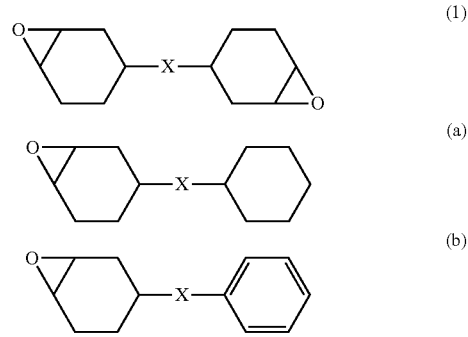

wherein X of formula (1), (a) or (b) represents a single bond or a linking group,
wherein said method comprises:
(1) subjecting a compound represented by Formula (1″) to a dehydration reaction to obtain a compound represented by Formula (1′):

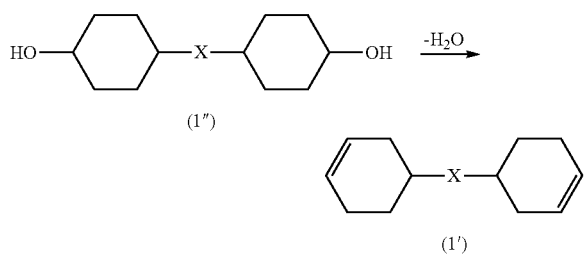

wherein X of formula (1″) or (1′) represents a single bond or a linking group;

(2) reacting the compound represented by Formula (1') with an organic peracid to obtain a reaction product containing the compound represented by Formula (1); and
(3) fractionally distilling the reaction product using a rectification column with a number of actual plates from 1 to 20 under the conditions below:
a column bottom temperature of 100 to 250° C.,
a column top temperature of 80 to 200° C.,
a column top pressure from 0.1 to 50 mmHg, and
a column bottom pressure from 1 to 200 mmHg.

7. The method for producing an alicyclic epoxy compound product according to claim 6, wherein a compound represented by Formula (a) and a compound represented by Formula (b) are removed by the fractional distillation in (3):

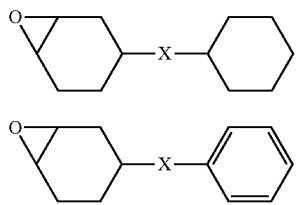

wherein X of formula (a) or (b) represents a single bond or a linking group.

8. A curable composition comprising the alicyclic epoxy compound product described in claim 1.

9. The curable composition according to claim 8, further comprising a curing agent (B) and a curing accelerator (C).

10. The curable composition according to claim 8, further comprising a curing catalyst (D).

11. A cured product of the curable composition described in claim 8.

12. The cured product according to claim 11, wherein a light transmittance at a wavelength of 400 nm is 50% or greater.

13. An encapsulant comprising the curable composition described in claim 8.

14. An adhesive comprising the curable composition described in claim 8.

15. A coating agent comprising the curable composition described in claim 8.

16. An optical member comprising the cured product described in claim 11.

* * * * *